United States Patent Office 2,891,923
Patented June 23, 1959

2,891,923

SILICONE SUPPLEMENTED FILLERS AND RUBBERS, AND METHODS FOR THEIR MANUFACTURE

Ellis H. Phreaner, Los Angeles, Calif., assignor of thirty-three and one-third percent to H. Calvin White, Los Angeles, Calif.

No Drawing. Application March 1, 1954
Serial No. 413,470

16 Claims. (Cl. 260—37)

This invention relates to a method of dispersing silicone oils on filler particles, and the resulting product, and to the use of these silicone oil filler compositions in compounding and reinforcing rubber compositions. This application is a continuation-in-part of my co-pending application Serial No. 776,159, filed September 25, 1947, entitled "Rubber-Silicone Compounds and Their Manufacture."

It has been noted in extensive tests with silicone oil additions to rubber composition that the physical qualities of the unvulcanized compounds and of the vulcanized rubber compositions are very materially changed depending on the nature (kind) and degree of dispersion of the silicone oil in relation (1) to the reinforcing filler and (2) to the rubber molecule. It is now recognized that natural and synthetic rubber compositions owe many of their qualities to the surface adhesion forces between the rubber molecule and the reinforcing filler surfaces, as well as to the effect of other additives such as plasticizers on the rubber chains and on these surface phenomena.

The invention contemplates generally the improvement of both natural and synthetic rubber compositions, although the advantages of the invention are rather distinctly pronounced as to synthetic rubbers of the following type: butadiene-styrene, butadiene-acrylonitrile, chloroprene, chloroprene-isoprene, chloroprene-acrylonitrile polymers and co-polymers, and poly-acrylic synthetic rubbers. Incorporation of thermally stable silicone oils in these rubbers, particularly by the hereinafter explained methods involving aqueous slurry deposition of the silicone oil on filler particles, have been found to produce a number of important advantages and improved properties.

The silicone oils specified in this application have a quality of orientation producing quite different surface bond affinities dependent on their surface relation to polar or nonpolar bodies. In the presence of polar forces this orientation produces the following molecular structure, wherein "R" is a hydrocarbon, e.g. alkyl aryl or vinyl group, as will be later described in more specific reference to this polymeric siloxanes with which I am herein concerned.

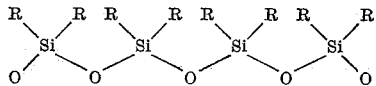

The properties of dispersion herein described and of the resulting rubber compositions reinforced with the filler, can be traced to this orientation quality of the silicone oils relative to the filler surface in aqueous dispersions. Therefore the processes claimed and the products are dependent on the use of silicone oils capable of such orientation, and to the kind of filler, at least for the maximum realization of qualities.

The silicone oils used in this dispersion process are the completely polymerized, thermally stable liquid polymeric dihydrocarbon substituted siloxanes in which the substituent groups are of the class consisting of alkyl aryl and vinyl groups, and they may be of open chain or cyclic structure.

Particularly good results have been accomplished with silicone polymers preponderately of the thermally stable open chain dimethyl substituted siloxanes with trimethylsiloxy or other fully saturating or blocking end groups, and having the general formula:

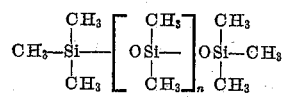

where "$n$" may be any number from 4 to any larger number permitted to the extent of the silioxane remaining liquid.

As illustrative of the cyclic silicone polymers, I may use cyclic dimethylsiloxane polymers of the general formula $[(CH_3)_2SiO]_x$, where "$x$" may be a number ranging, for example, from 3 to 8 inclusive, or above.

It is further observed that other alkyl aryl or vinyl radicals may be substituted for the methyl groups for such purposes as to have a modifying effect on the physical characteristics of the polymerization product, and particularly for the purposes of the invention, to afford better dispersion qualities in compounding of the rubber formulae, and corresponding improvement in the finished product.

The invention contemplates broadly the use of any suitable fillers or filler mixture, within the field of silicic (i.e. silicon-containing) and carbon black fillers. Desirable fillers are those having basic qualities by reason of their chemical composition or surface oxidation.

The fillers found particularly beneficial for the purposes of the invention are in general the silicon oxides and the mineral silicates, preferably the alkali earth metal silicates. Chemical and microscopic examinations indicate a considerable variation in the composition and structure of variously produced silicas and silicates, as well as the calcium, aluminum, magnesium and silicate complexes. In commercial silicas of amorphous structure with a refractive index of 1.44 to 1.46, there are usually present bi-refringent crystals of higher refractive index which are various mineral silicates, while in the prepared mineral silicates the presence of amorphous silica is noted.

Various natural silicates, clays, micas, are also adaptable, the essential quality being the surface adhesion forces between such siliceous compositions and the oriented silicone molecule.

These fine silica and silicate fillers (e.g. 10 to 100 millimicrons in particle size) may be in the form of fine dry powders, or as filter cake, or as water slurries of relatively low solid content.

The water slurry dispersion process involves homogenizing a silicone oil in a water slurry of the filler, preferably silica or silicate pigments, the effect of which is to remove the homogenized silicone oil from the water phase onto and in oriented bonding relation to the filler particles.

The work of adhesion between the surfaces of a silicic particle and the oriented Si—O side of the silicone molecule is greater than the work of adhesion between the silicone molecules and the water phase, and the silicone molecule is thus exhausted from the water phase by preferential bonding to the silicic particle. The silicone oil coating on the filler, thus oriented, provides a new filler particle surface of tightly packed organic groups.

It may be assumed that the adhesive force of the filler particle for the oriented silicone molecule, in competition with the work of adhesion of water for the silicone, is so much greater that it will be effective through more than one molecular layer and that the silicone coating of the filler particle may thus be more than mono-molecular.

Depending on this factor, on the fineness of the filler particle and hence its total surface, a ratio of silicone oil to filler will be reached at which the adhesive force of the filler particle for the silicone molecule will not exceed the intrasurface adhesion between the silicone and the water phase. When this point is reached no more oil can be adsorbed by the filler particle from the water phase. Generally weight ratio of silicone oil to the coated filler will range between about 5% to 30%.

When mechanical homogenization of the silicone oil, as by colloid milling, is discontinued, any free silicone oil not oriented and bonded to the filler particles will separate as a separate phase and can be recovered as by decantation.

The process thus provides a method of establishing an oriented bonded surface dispersion of this type of silicone molecule on silicic filler particles and eliminates, as well, the presence of free discrete masses of silicone oil. It is thought that the complete orientation of the silicone molecule sealing off the Si—O side and exposing only organic groups, and the elimination of the presence of unoriented discrete masses of silicones, may account for the great reduction in water absorption at elevated temperatures of rubber compositions compounded with water slurry silicone-filler dispersions, as compared with the same compositions compounded with silicone-filler dispersion by the dry milling process, which latter compositions have unusually high water absorption at these elevated temperatures.

Not only in the quality of resistance to water absorption but in numerous other qualities, improved rubber compositions result from the use of water slurry silicone-filler dispersions in comparison with silicone modified rubbers using reinforced with, e.g. dry mill dispersions, as will be shown in examples.

The use of emulsifiers to facilitate the homogenization of the silicone oils in the thus modified water phase while reducing mixing requirements to disperse the oil in the water phase have not been found necessary when suitable mechanical means of breaking up the silicone oil masses are employed, such as colloid milling or turbulent flow of the silicic filler slurries. No doubt the presence of the large surface area of the fillers greatly aids in emulsifying the oil and in homogenizing it in the water slurry. Useable emulsifiers are morpholine with long chain (stearic or oleic) acids, or alcohols.

The silicone molecules of chain structure oriented on the filler particles produce qualities in rubber compositions not obtainable by the use of chlorosilane vapor treated fillers. No doubt the mass structure produced by the hydrolysis and condensation of these functional group silanes when applied to fine fillers, while rendering the fillers hydrophobic, as is the case with dry mill dispersions with silicone oils, do not provide the complete sealing off orientation bonding of the Si—O groups and tight surface packing of organic groups that are obtained by the present water dispersion method.

The process requires that the silicone oil be thoroughly broken up and dispersed in the silicic filler slurry. The emulsifying or homogenizing process can however be completely mechanical and can be accomplished by vigorous agitation, by colloid milling or by turbulent flow under pressure through venturi tube restrictions.

In order to effectively exhaust the silicone oil from the aqueous dispersion and adsorb it on the filler, it is essential that the silicone oil be very thoroughly emulsified, that is that the emulsification goes essentially beyond the droplet state, or if the emulsification is not so extreme, that the operation be continued for a sufficient period, to effect the uncoiling of the silicone molecules from their discrete particle state and to thus provide for their orientation with the water phase and with the filler particle. This uncoiling phenomenon goes on even when silicone oil is added without agitation to a water surface but it is of course very slight if the masses of oil remain undispersed without stresses to break the intermolecular adhesion forces. In practice, advantage can be taken of these phenomena by adding to a water slurry of the filler, a water emulsion of the siloxane in which the latter is very completely emulsified in extremely fine particle form.

The mixing preferably continues until exhausting of the silicone oil from the water phase is complete, or until no further removal of oil from the slurry onto the filler particles is obtainable. Any excess oil whether as a separate phase as in the case where a chemical emulsifier is absent, or with the separated water phase if emulsified, is removed by skimming or decanting and the concentrated slurry or filter cake may be either dried and mill or Banbury-compounded with the elastomer, or used as a filter cake or more dilute slurry for coagulation with latices.

It is of interest to note that the dried filter cake although in the form of large crumbs or cake can be added directly to the rubber elastomer on a mill or in a Banbury mixer without regrinding to a powder, and that the dispersion in rubber elastomers is very rapid and complete. It is also free from dust, which is a very objectionable feature in handling and milling fine powders.

EXAMPLE I

To a water slurry containing 8% solids consisting of fine particles of amorphous silica having a refractive index of 1.46, and absorbed thereto about 8% birefringent crystals of calcium aluminum silicate, with about 0.8% impurities of iron and magnesium, was added 8.33% (based on slurry solids) of a dimethyl silicone oil of the open chain type herein defined, having a viscosity of 500 centistrokes.

The slurry was passed through a colloid mill (recirculated) for approximately five minutes. On discontinuing this mechanical homogenizing process and permitting the slurry to settle, no silicone oil was detected in the water phase.

The slurry was filtered, the filtrate showing no presence of silicone oil. The filtered solids were reslurried with water and refiltered, again showing no indication of the presence of free masses of silicone oil. The solids were dried and reduced to a fine powder and where compounded with a butadiene-acrylonitrile copolymer on Formula A below.

The same original silica water slurry as above, but without the addition of silicone oil, was passed through the colloid mill, filtered, dried and pulverized in the same manner.

To a part of this dried silica there was added 8.33% of the same silicone oil by a ball milling process. This was compounded on Formula B.

To another part of this dried silica there was added 8.33% silicone oil simply by a stirring-in process and this was compounded in Formula C.

Still another part of the same dried silica was compounded in Formula D, without any silicone oil addition.

On agitating with water the powders of Formula A, water slurry dispersion, and Formula B, adequate dry milling, were hydrophobic, while the C formula was largely wetted and the silica without silicone addition was completely wetted. Table 1 records the formula as to filter content and silicone oil, which was otherwise a normal organic sulphur cure composition with the usual antioxidants, and gives the plasticity of the uncured stock and certain physical qualities of the composition when cured 1 hour at 287° F.

The composition without plasticizer serves as a standard for comparing the effectiveness of silicone addition, and the values for the "stirring in" and "dry mill" process afford a comparison illustrating that a con-

Table 1

| Formula | A<br>Water Slurry Dispersion | B<br>Dry Mill Dispersion | C<br>Stirring | D<br>No Silicone |
|---|---|---|---|---|
| Butadiene-acrylonitrile | 100.00 | 100.00 | 100.00 | 100.00 |
| Dimethyl silicone oil | 6.50 | 6.50 | 6.50 | |
| Silica | 78.0 | 78.0 | 78.0 | 78.0 |
| Mooney Shear Viscosity, Small Rotor, 4 mm. at 212° F | 43 | 63 | 118 | 127 |
| 300% modulus, p.s.i. | 530 | 870 | 1,040 | 1,520 |
| Shore A Hardness | 53 | 58 | 66 | 68 |
| Abrasive Wear Loss in cc. (Angle Abrasion) | 4.0 | 5.2 | 6.0 | 6.0 | siderable difference in qualities do occur depending on the method of dispersing the silicone oils on reinforcing silicic fillers.

Benefits from the water slurry dispersion method are noted in much better plasticity, lower shear viscosity, and in reducing the stiffness (modulus) and hardness of the composition. Abrasion wear is also greatly reduced by the waste slurry dispersion method.

EXAMPLE II

The same dispersion methods, the water slurry process and the dry milling process of adding silicone oils, with the same filler and silicone oil were repeated and compounded on the formula of Table 2, which also includes a composition with dioctylphthalate as a plasticizer. These compositions were tested for distilled water absorption with results shown in this table. Conventional organic sulphur cures, zinc oxide, and amine type antioxidants complete the formula.

Table 2

| Formula | A<br>Water Slurry Process | B<br>Dry Mill Process | C<br>Dioctyl-phthlate | D<br>No Plasticizer |
|---|---|---|---|---|
| Butadiene-Acrylonitrile | 100.00 | 100.00 | 100.00 | 100.00 |
| Dimethyl Silicone Oil | 5.0 | 5.0 | | |
| Dioctylphthlate | | | 15.0 | |
| Silica | 60.0 | 60.0 | 60.0 | 60.0 |
| Distilled Water Absorption at Room Temperature: | | | | |
| Percent by Weight 24 hours | 0.54 | 0.75 | 8.45 | 7.47 |
| Percent by Weight 168 hours | 1.25 | 1.79 | 8.21 | 7.71 |
| Absorption at 70° C.: | | | | |
| Percent by Weight 24 hours | 1.80 | 4.30 | 9.77 | 8.62 |
| Percent by Weight 168 hours | 3.07 | 12.89 | 10.96 | 9.40 |
| Absorption at 100° C.: | | | | |
| Percent by Weight 24 hours | 2.59 | 10.21 | 9.07 | 7.08 |
| Percent by Weight 168 hours | 4.56 | 16.56 | 8.86 | 7.31 |

Silicone addition by both processes greatly improves resistance to water absorption at room temperature, the slurry dispersion process composition showing even more resistance than the mill dispersion composition.

However, at elevated temperatures the composition containing silicone oil by the dry mill dispersion shows an unexpected high water absorption which phenomenon is completely reversed by using the water slurry dispersion method silicone-silica filler. This latter composition shows considerably greater resistance to water absorption at all temperatures, than the control formula. It is believed that the complete orientation bonding of the silicone molecule to the siliceous pigment and the elimination of discrete unoriented free masses of silicone oil, accounts for this striking difference in water absorption at elevated temperatures.

EXAMPLE III

One hundred fifty grams of a commercial filler designated as fine calcium silicate in the form of a dry powder was slurried with 2000 ml. of distilled water.

A microscopic examination of this filler showed it to be largely of crystal structure having a refractive index of 1.52, with however the presence of a considerable amount of amorphous silica with refractive index of 1.45 to 1.46.

To this silicic filler slurry was added 15 grams of a methyl phenyl substitution open chain structure silicone oil having a viscosity of 550 centistokes. This silicone oil slurry mix was recirculated through a system comprising a centrifugal pump with a venturi tube type restriction in the recirculating line to produce a turbulent flow. After recirculating for approximately 15 minutes, the silicone oil was completely exhausted from the water phase as evidenced on settling the slurry in a separating funnel. The slurry was filtered, rewashed with 3000 ml. of distilled water with no evidence of free silicone oil, and was refiltered.

The filter cake containing 24.5% solids was then added to 1200 grams of butadiene-acrylonitrile latex (of 26% solid content) and the mixture was coagulated using a 1½ solution of calcium chloride. A fine crumb coagulum and a clear mother liquor (filtrate) was obtained by the co-coagulation process.

Upon rewashing, filtering and drying this masterbatch, the crumb was banded on a two roll rubber mill. It showed no indication of free powder or oil and formed a smooth plastic sheet.

It has been found that these silicone oils, i.e. the dihydrocarbon substituted polymeric siloxane chain structures, are exhaused when emulsified by mechanical means with water slurries of carbon black fillers. The silicone oils are adsorbed on the carbon black particles and are firmly bonded thereto. After proper dispersion no free oil is evident in these slurries following high dilution with water or changes in pH that break even good chemical emulsions of silicone oils. This phenomenon may be attributed to the oxidized surface of the black particles, rendering them of sufficient polarity to attract the oriented silicone oil chain structures. This preferential absorption is good whether the silicone oil is emulsified by mechanical means (a non-stable emulsion) or by the addition of chemical emulsifiers such as combinations of morphaline and organic acids such as stearic acid.

As in silicone oil-inorganic filler dispersions, the fineness of particle size with resulting change in surface modifies the amount of silicone oil that can be adsorbed by the carbon black fillers. Co-coagulation of the silicone oil-carbon black filler dispersion with rubber latices has been readily accomplished and as much as 100 parts by weight of filler with 100 parts by weight of rubber has been co-coagulated without any appreciable loss of either filler, silicone oil, or rubber.

The following examples describe operations using dimethyl and di-ethyl silicone oils on both channel black and furnace black.

EXAMPLE IV

Ten parts by weight of a furnace black having a particle size in the range of 60 to 90 millimicrons were mechanically mixed with 90 parts by weight of water by a method of kinetic dispersion. The pigment agglomerates in the low viscosity liquid were given a high speed acceleration in a cylindrical impeller and were forced through narrow openings in a stationary outer shell striking these openings with great impact force. The carbon black particles were thus completely wetted and the agglomerates dispersed in the water phase.

One part of a dimethyl silicone oil, a di-hydrocarbon substituted polymeric siloxane with tri-methyl end blocked chains, having a viscosity of 200 centistokes at 20° C., was then added to the mixer and the kinetic dispersion process was continued for a period of five minutes. On removal from the mill, the slurry was uniform with no evidence of any free silicone oil.

A small amount of the slurry was diluted with 10 times its weight in water. On standing in a separating funnel no free silicone oil was in evidence, nor was there any free oil when the slurry was acidified from its initial pH of 6.5 to 5.0.

Without filtering, the slurry was dried at 150° C. to form a soft cake which was readily dispersable in a butadiene-acrylonitrile elastomer having a Mooney viscosity of 50 LM at 212° F.

A slurry produced by the same method of dispersion containing 10% solids was mixed with a butadiene-acrylonitrile latex having 33.4% solids in the proportion of 60 parts dry weight silicone oil-filler dispersion to 100 parts dry weight rubber. To avoid any pre-coagulation of the latex the pH of the slurry was raised by the addition of morphaline from approximately 6.5 to 8.0 before adding it to the latex.

This latex slurry mixture was coagulated by simultaneously adding the latex mixture and a 1½% calcium chloride solution in a trough delivering at a sharp inclination, giving a rapid flow, to a tank containing a small amount of the coagulating solution, in which tank moderate agitation was maintained.

A medium size crumb was obtained with a clear mother liquor. The crumb was washed, and dried at 105° C. for three hours in a circulating air oven.

The masterbatch containing approximately 100 parts butadiene-acrylonitrile rubber, 54.5 parts of furnace black and 5.5 parts silicone oil was sheeted on a two roll rubber mill and compounded with 5 parts zinc oxide, 0.50 part stearic acid, 2.50 parts tetramethylthiuram disulfide and 1.50 parts sulfanamid.

The composition was cured 1 hour at 290° F., and had a modulus 300% of 1345 p.s.i., a tensile at break of 2475 p.s.i., and an elongation 520%. The tear strength was excellent and the degree of reinforcing as evidenced by modulus was higher than normally obtainable for this formula.

EXAMPLE V

Fifteen parts by weight of channel black was slurried with 85 parts by weight of water with the addition of 0.4 parts by weight of a sodium salt of polymerized alkylaryl sulfonic acid by recirculating the mixture through a colloid mill at a setting of 0.008" for a period of 4 minutes. 12.75 parts by weight of a di-ethyl silicone oil, end blocked with triethyl siloxanes, having a viscosity of 350 centistokes at 20° C. was then added with continued recirculation through the colloid mill for a period of 5 minutes.

The slurry was then filtered and dried to give a soft cake which dispersed readily with a butadiene-styrene copolymer having a Mooney viscosity of 45 ML at 212° F., by Banbury mixing for 6 minutes. The composition when sheeted on a two roll rubber mill gave a very shiny cut surface, used by rubber compounders as an evidence of good dispersion.

These rubber-filler-silicone oil compositions when compounded with zinc oxide and mineral sulphur or organic sulphur cures and vulcanized at usual temperature ranges of from 250° F. to 320° F., produce somewhat better and "tighter" cures than similar compositions omitting the dispersed silicone oil. This is possibly due to elimination, at least in part, of absorption of the cure ingredients by the fillers. At least it can be said that the vulcanizing processes are entirely normal and extend to the wide variety of curing ingredients and accelerators generally used in curing the organic rubbers.

I claim:

1. The method that includes mechanically agitating a water slurry containing a uniform mixture of dispersed fine particles of solid filler and dispersed finely divided particles of completely polymerized thermally stable liquid dihydrocarbon substituted siloxane having polymeric Si—O groups and substituent groups of the class consisting of alkyl, aryl and vinyl groups, thereby orienting by reason of the aqueous dispersion the said Si—O groups to one side of the siloxane molecules and preferentially bonding the filler particles to the Si—O groups so oriented with consequent uniform deposition of the siloxane on the filler particles, and drying and producing the filler in essentially powder form.

2. The method that includes mechanically agitating a water slurry containing a uniform mixture of dispersed fine particles of solid filler and dispersed finely divided particles of completely polymerized thermally stable liquid dihydrocarbon substituted siloxane having polymeric Si—O groups and substituent groups of the class consisting of alkyl, aryl and vinyl groups, thereby orienting by reason of the aqueous dispersion the said Si—O groups to one side of the siloxane molecules and preferentially bonding the filler particles to the Si—O groups so oriented with consequent uniform deposition of the siloxane on the filler particles, and separating any remaining free siloxane from the slurry, and drying and producing the filler in essentially powder form.

3. The method that includes mechanically agitating a water slurry containing a uniform mixture of dispersed fine particles of solid filler and dispersed finely divided particles of completely polymerized thermally stable liquid dihydrocarbon substituted siloxane having polymeric Si—O groups and substituent groups of the class consisting of alkyl, aryl and vinyl groups, thereby orienting by reason of the aqueous dispersion the said Si—O groups to one side of the siloxane molecules and preferentially bonding the filler particles to the Si—O groups so oriented with consequent uniform deposition of the siloxane on the filler particles, and separating and drying the resulting coated filler, and filler particles being in essentially powder form and in the size range of about 10 to 100 millimicrons.

4. The method that includes mechanically agitating a water slurry containing a uniform mixture of dispersed fine particles of solid filler and dispersed finely divided particles of completely polymerized thermally stable liquid dihydrocarbon substituted siloxane having polymeric Si—O groups and substituent groups of the class consisting of alkyl, aryl and vinyl groups, thereby orienting by reason of the aqueous dispersion the said Si—O groups to one side of the siloxane molecules and preferentially bonding the filler particles to the Si—O groups so oriented with consequent uniform deposition of the siloxane on the filler particles, and drying and producing the filler in essentially powder form, the weight quantity of the siloxane thus deposited on the filler being between 2.5 to 30 percent of the weight of the filler.

5. The method as defined in claim 1, in which the filler is of the group consisting of silica, metal silicates and carbon.

6. The method as defined in claim 4, in which the filler comprises a metal silicate.

7. The method as defined in claim 4, in which the filler is silica.

8. The method defined in claim 1, in which a slurry of the water and filler is formed, and then is admixed with an emulsion of the siloxane and water.

9. As a product, the siloxane coated filler prepared by the method of claim 1.

10. As a product, the siloxane coated metal silicate filler prepared by the method of claim 6.

11. As a product, the siloxane coated silica filler prepared by the method of claim 7.

12. The method that includes milling a siloxane-coated filler with a rubber of the class consisting of natural and synthetic rubbers to produce a master batch containing at least 1½ parts by weight of the siloxane for 100 parts of the rubber, said filler being made by mechanically agitating a water slurry containing a uniform mixture of dispersed fine particles of solid filler and dispersed finely divided particles of completely polymerized thermally stable liquid dihydrocarbon substituted siloxane having polymeric Si—O groups and substituent groups of the class consisting of alkyl, aryl and vinyl groups, thereby orienting by reason of the aqueous dispersion the said Si—O groups to one side of the siloxane molecules and preferentially bonding the filler particles to the Si—O groups so oriented with consequent uniform deposition of the siloxane on the filler particles, and drying and producing the filler in essentially powder form.

13. The process of claim 12 followed by the further step of vulcanizing the rubber-filler mixture.

14. The vulcanized product of claim 13.

15. The process of claim 12, in which said filler is of the group consisting of silica, metal silicate and carbon, and the process includes the further steps of vulcanizing the master batch.

16. The vulcanized product prepared by the process of claim 15.

References Cited in the file of this patent

UNITED STATES PATENTS

| | | |
|---|---|---|
| 2,140,375 | Allen et al. | Dec. 13, 1938 |
| 2,392,805 | Biefeld | Jan. 15, 1946 |
| 2,429,439 | Westfahl et al. | Oct. 21, 1947 |
| 2,567,315 | Bidaud | Sept. 11, 1951 |
| 2,610,167 | Grotenhuis | Sept. 9, 1952 |
| 2,639,225 | Venuto | May 19, 1953 |